US005722459A

United States Patent [19]
Kim et al.

[11] Patent Number: 5,722,459
[45] Date of Patent: Mar. 3, 1998

[54] PRESSURE CONTROL VALVE OF A HYDRAULIC CONTROL SYSTEM OF AN AUTOMATIC TRANSMISSION

[75] Inventors: Young Bae Kim; Jae Duk Jang, both of Kyungki-do, Rep. of Korea

[73] Assignee: Hyundai Motor Company, Seoul, Rep. of Korea

[21] Appl. No.: 656,389

[22] Filed: May 31, 1996

[30] Foreign Application Priority Data

May 31, 1995 [KR] Rep. of Korea ............... 95/14256

[51] Int. Cl.⁶ ............................................. F15B 13/043
[52] U.S. Cl. .......................... 137/625.64; 137/625.66
[58] Field of Search ........................ 137/625.61, 625.64, 137/625.66

[56] References Cited

U.S. PATENT DOCUMENTS

| | | | |
|---|---|---|---|
| 3,454,026 | 7/1969 | Orme | 137/625.64 X |
| 3,486,801 | 12/1969 | Frayer | 137/625.64 X |
| 3,727,487 | 4/1973 | Forster et al. | 137/625.64 X |
| 4,321,941 | 3/1982 | Hunschede et al. | 137/625.64 X |
| 4,590,968 | 5/1986 | Wolfges | 137/625.64 |
| 4,605,197 | 8/1986 | Casey et al. | 137/625.64 X |
| 4,617,968 | 10/1986 | Hendrixon | 137/625.64 |
| 4,657,041 | 4/1987 | Mitsui | 137/625.64 X |
| 4,898,361 | 2/1990 | Bender et al. | 137/625.64 X |
| 4,966,195 | 10/1990 | McCabe | 137/625.64 X |
| 5,031,663 | 7/1991 | Fukuta et al. | 137/625.64 |
| 5,042,832 | 8/1991 | Takahashi et al. | 137/625.64 X |
| 5,051,631 | 9/1991 | Anderson | 137/625.61 X |
| 5,054,599 | 10/1991 | Marcott | 137/625.64 X |
| 5,060,695 | 10/1991 | McCabe | 137/625.64 X |
| 5,174,338 | 12/1992 | Yokota et al. | 137/625.64 |
| 5,577,584 | 11/1996 | Ortmann | 192/109 F X |

FOREIGN PATENT DOCUMENTS

| | | | |
|---|---|---|---|
| 63-231077 | 9/1988 | Japan | 137/625.64 |
| 7-77274 | 3/1995 | Japan . | |

*Primary Examiner*—Gerald A. Michalsky
*Attorney, Agent, or Firm*—Christie, Parker & Hale, LLP

[57] ABSTRACT

A pressure control valve of a hydraulic control system of automatic transmissions has reducing pressure PR supplied from a reducing valve by duty control of a pressure control solenoid valve controlled by a transmission control unit thereby changing line pressure PL supplied from a manual valve into the control pressure and supplying the control pressure to the friction element. The valve comprises a valve spool operated by the duty-controlled reducing pressure, a valve body in which the valve spool linearly moves, and a feedback line which communicates the control pressure with one side of the valve body thereby reducing the deviation of the control pressure.

6 Claims, 2 Drawing Sheets

PRESSURE CONTROL VALVE OF A HYDRAULIC CONTROL SYSTEM OF AN AUTOMATIC TRANSMISSION

BACKGROUND OF THE INVENTION

The present invention relates to a hydraulic control system of automatic transmissions and, more particularly, to a pressure control valve of a hydraulic control system of automatic transmissions which stabilizes a clutch shift control pressure so that it improves accuracy of control.

In vehicles, the transmission is one part of the power transmitting system. It is mounted between the clutch and driving shaft thereby increasing or decreasing the rotary power of the engine transferred in accordance with the driving condition of the vehicle, and is provided with reverse apparatus also. The transmissions are classified into two categories 1) manual transmissions and 2) automatic transmissions.

The automatic transmission comprises a power train having a planetary gear set, and a hydraulic control system for controlling friction elements such as a braking of the power train and a clutch with hydraulic pressure.

FIG. 2 is a fragmentary view of a hydraulic circuit diagram of a hydraulic control system of an automatic transmission having a pressure control valve of the prior art. It comprises a pressure control valve 100 for supplying line pressure PL from an oil pump (not shown) to a friction element (not shown), a pressure control solenoid valve 102 for controlling the pressure control valve 100, and a transmission control unit(TCU) for controlling the pressure control solenoid valve 102.

The line pressure PL generated from the engine is reduced by a reducing valve(not shown) to reducing pressure PR thereby acting on the pressure control solenoid valve 102.

The pressure control valve 100 comprises a first port 104 in which the line pressure PL flows, a second port 106 which receives the line pressure from the first port 104 and supplies shift control pressure SP to a friction element (not shown), a third port 108 in which reducing pressure PR reduced by the reducing valve(not shown) acts, a fourth port 110 in which the reducing pressure PR acts by duty control of a pressure control solenoid valve 102, an exhausting port 112 for exhausting the line pressure supplied to the friction element, and a valve spool 114 for opening and shutting these ports.

The valve spool 114 of the pressure control valve 100 includes a first land 116 on which the reducing pressure PR provided to the third port 108 acts, a second port 118 having a larger pressure acting area than that of the first land 116, and a third land (plug) 122 on which the reducing pressure, which is duty-controlled by the pressure control solenoid valve 102, acts and which is elastically supported by an elastic member 120.

As described above, in the pressure control valve 100 of the hydraulic control system of the automatic transmission, when the transmission control unit TCU controls the pressure control solenoid valve 102 to a high duty ON state, as the reducing pressure is exhausted to the exhausting port 124 thereby releasing the reducing pressure at the fourth port 110, the reducing pressure provided to the third port 108 overcomes the elastic force of the elastic member 120 and pushes the valve spool 114 to the left so that the first port 104 is closed by the second land 118 thereby stopping control pressure SP provided to the friction element.

And when the transmission control unit changes the pressure control unit 102 from the high duty ON state to a low duty OFF state, as the exhausting port 124 is closed, the reducing pressure is no longer exhausted and begins passing to the fourth port 110. Then the hydraulic pressure of a left detecting chamber "a" acts, and the valve spool 114 moves to the right by the elastic force of the elastic member 120 and the reducing pressure acting in the left detecting chamber "a", whereby the first port 104 communicates with the second port 106 so that the line pressure PL is controlled to be the control pressure SP.

The control pressure SP, generated by the above repetitive operation, is supplied to the friction element.

At this point, the control pressure is determined in accordance with a duty ratio, the duty ratio is decided in accordance with delay time of the ON state at a given time.

The control pressure generated at that time determines a mean pressure of rest pressures and control pressures generated by the duty ratio of the pressure control solenoid valve and the control pressure according to the line pressure generating time.

But, as the degree of changing the control pressure is too much, it is difficult to control the pressure during engagement of the friction element, and, as the deviation of an initial optimized pressure control is big, it is difficult to precisely control and shift quality is poor.

SUMMARY OF THE INVENTION

The present invention is made in an effort to solve the above problems. The object of the invention is to provide a pressure control valve of a hydraulic control system of automatic transmissions which minimizes the degree of changing of pressure control pressure between the rest pressure generated by duty control of a pressure control solenoid valve and line pressure, and stabilizes a pressure control pressure provided to a friction element so that it improves accuracy of control and shift quality.

To achieve the above objectives, the present invention provides a pressure control valve of a hydraulic control system of automatic transmissions, in which reducing pressure PR supplied from a reducing valve by duty control of a pressure control solenoid valve controlled by a transmission control unit thereby changing line pressure PL supplied from a manual valve into the control pressure and supplying it to the friction element, comprises a valve spool operated by the duty-controlled reducing pressure, a valve body in which the valve spool linearly moves, and a feedback line which communicates one side of a conduit for supplying the control pressure with one side of the valve body thereby reducing the deviation of the control pressure.

The valve spool includes a first land on which reducing pressure acts, a second land which has a larger pressure acting area than that of the first land and is opposite thereto, a third land on which duty control pressure acts, and a plug, on which the duty control pressure acts, and which is elastically supported by the elastic member.

The valve body includes a first port in which the line pressure flows, a second port for providing the control pressure supplied to the friction member, a third port in which the reducing pressure acts, a fourth port where the duty control pressure is provided by the pressure control solenoid valve, a fifth port where a part of the control pressure provided from the second port to the friction element is fed back, and a sleeve which forms the fifth port and includes the plug therein.

The feedback line includes a damper, having at least one orifice, to stabilize the control pressure fed back.

When the pressure control solenoid valve is controlled from high-duty to low-duty by the transmission control unit, the duty control pressure of the fourth port is changed thereby overcoming the reducing pressure acted on, and the valve spool is forced to the right thereby communicating the first and second ports with each other and generating the shift control pressure to be supplied to the friction element.

At this point, some of the control pressure, flowing through the second port, passes through the damper of the feedback line and stabilized hydraulic pressure is supplied to a left detecting chamber thereby acting on the left side of the plug and stabilizing the operating state of the valve spool.

Further, when the pressure control solenoid valve is changed from the low duty state to the high duty state by the transmission control unit so that the control pressure is lowered, the valve spool moved to the right by an operating force owing to the reducing pressure acting on the third port. At the same time, the valve spool closes the first and second ports and releases the control pressure on the friction member to the exhausting port thereby reducing the hydraulic pressure to release the friction member.

BRIEF DESCRIPTION OF THE DRAWINGS

Further objects and other advantages of the present invention will become apparent from the following description in conjunction with the attached drawings, in which.

DETAILED DESCRIPTION

Figure 1:
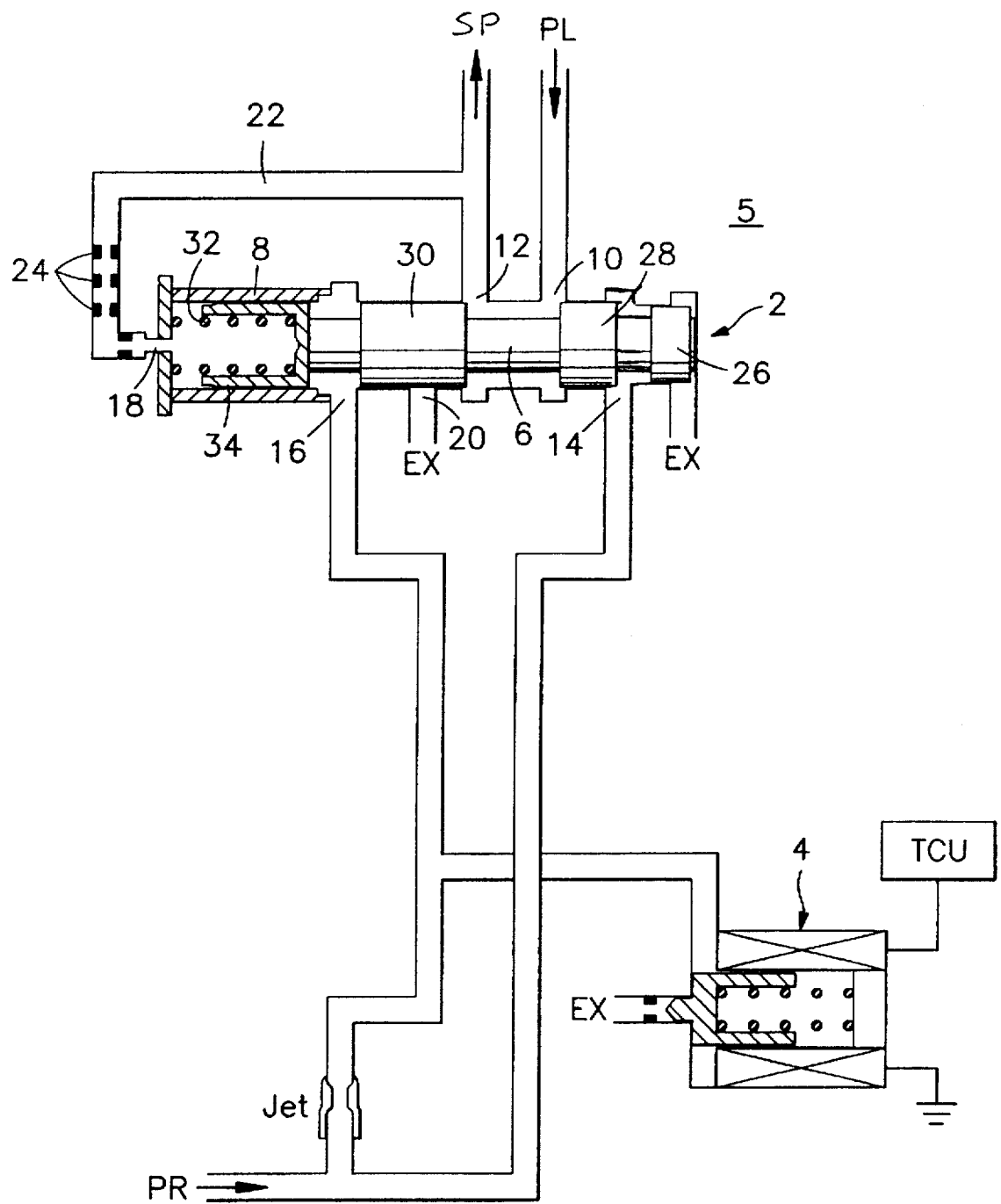
FIG. 1 is a fragmentary view of a hydraulic circuit diagram of a hydraulic control system of a automatic transmission having a pressure control valve according to the invention.
Figure 2:
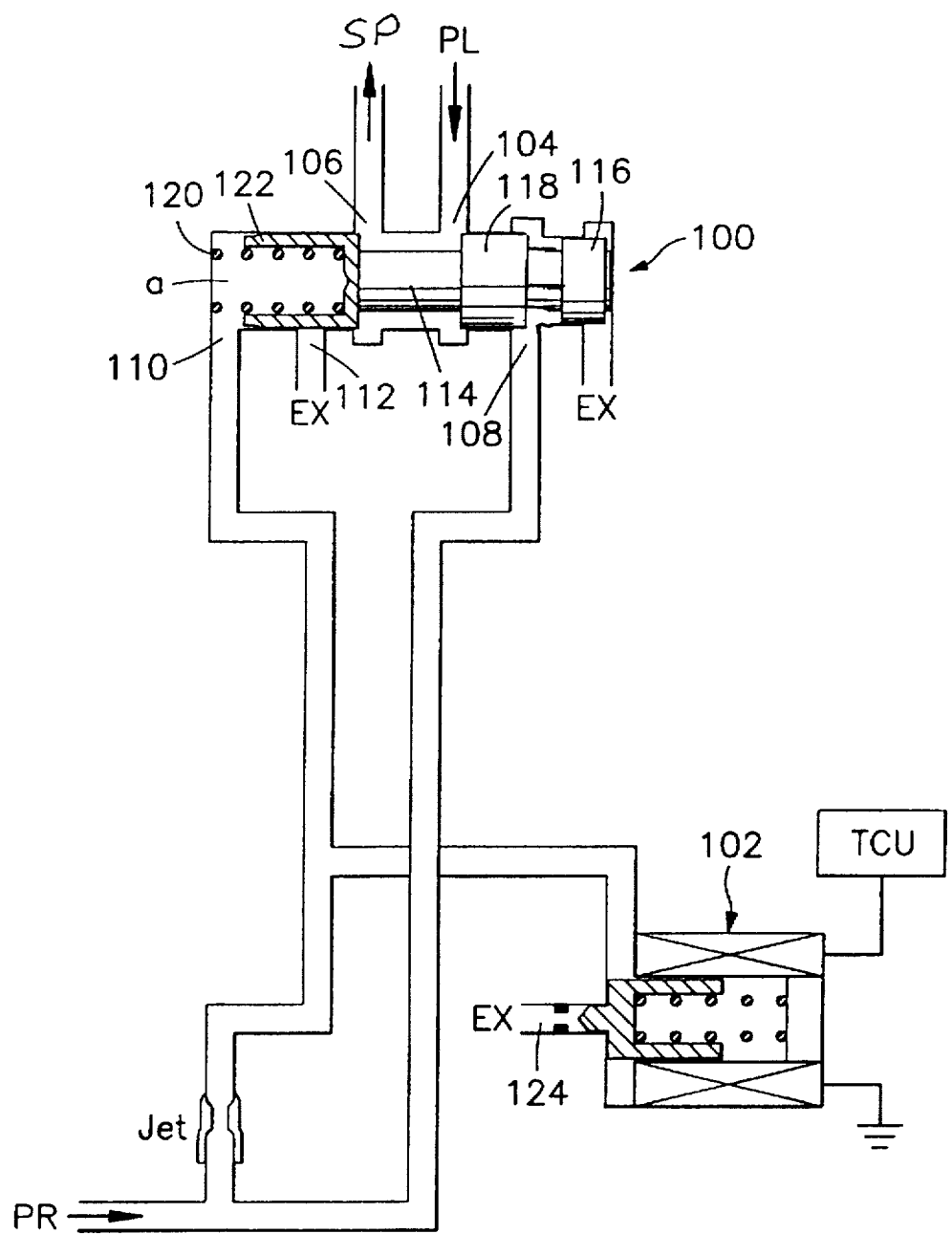
FIG. 2 is a fragmentary view of a hydraulic circuit diagram of a hydraulic control system of a automatic transmission having a pressure control valve of the prior art.

In FIG. 1, a pressure control valve of a hydraulic control system of automatic transmissions comprises a pressure control valve 2 for providing line pressure PL from an oil pump (not shown) to a friction element (not shown), and a transmission control unit TCU for controlling a pressure control solenoid valve 4 controlling the pressure control valve 2.

The pressure control valve 2 includes a valve body 5 having ports through which the line pressure PL and reducing pressure PR flows in and out, a valve spool 6 operated by the line pressure PL and reducing pressure PR flowed into these ports, and a sleeve 8.

The valve body 5 includes a first port 10 through which the line pressure PL flows to a second port 12 for providing a control pressure to a friction element(not shown), a third port 14 in which the reducing pressure acts, a fourth port 16 provided with a duty control pressure by the pressure control solenoid valve 4, a fifth port 18 where a part of the control pressure provided from the second port 12 to the friction element is fed back, and an exhausting port 20 for exhausting the control pressure which acted on the friction element.

The fifth port 18 is formed in one side of the sleeve 8 for having the plug 34 therein, and the control pressure supplied to the friction element(not shown) acts therein.

To feedback the control pressure from the second port 12 to the fifth port 18, it is provided with a feedback or conduit 22. The feedback line 22 has a damper 24 including at least one orifice to stabilize the feedback control pressure.

The valve spool 6 includes a first land 26 on which the reducing pressure PR acts, a second land 28, having a larger diameter and hence, a larger pressure acting area than that of the first land 26, on which the reducing pressure acts, a third land 30 on which duty control pressure of the pressure control solenoid valve 4 acts, and a plug 34 on which the duty control pressure of the pressure control solenoid valve 2 acts and which is elastically supported by the elastic member 32.

In the pressure control valve of the hydraulic control system of the automatic transmission as described above, the pressure control solenoid valve 4 is duty-controlled by the transmission control unit TCU, the reducing pressure and duty control pressure acting on the third and fourth ports 14 and 16 by the pressure control solenoid valve 4 are the same as the prior art, except as otherwise described below or illustrated in the drawings, so repetition of the common descriptions are omitted.

When the pressure control solenoid valve 4 is duty-controlled from the high duty ON state to the low duty OFF state, the valve spool 6 stuck to the left by the reducing pressure of the third port 14 is duty-controlled by the pressure control solenoid valve 4 thereby gradually moving to the right by the reducing pressure provided to the fourth port 16 and the elastic force of the elastic member 32.

Consequently, the second land 28 opens the first port 10 thereby communicating the first and second ports 10 and 12 with each other and changing the line pressure PL into the control pressure SP for the friction member.

By the above repetitive operation, the pressure control valve 2 determines the control pressure.

At this time, a part of the control pressure SP flows into the fifth port 18 through the damper 24 of the feedback line 22 thereby acting on the left side of the plug 34.

Therefore, the control pressure of the second port 12 repeatedly acts on the fifth port 18 through the damper 24 of the feedback line 22, on the opposite side of the plug 34, on which the duty control pressure of the pressure control solenoid valve 4 acts, thereby stabilizing the operation of the pressure control valve 2, reducing the deviation of the pressure of the pressure control valve 2 in accordance with the duty control pressure through the damper, and generating a steady control pressure.

As described above, the pressure control valve of the hydraulic control system of the automatic transmission according to the invention is controlled by the steady pressure through the damper and stabilizes the operation of the valve spool, so that it minimizes the deviation of the control pressure owing to the generating time of the rest pressure and line pressure during the duty control of the pressure control solenoid valve thereby making the hydraulic control more precise, and it provides steadier control pressure to the friction element thereby improving the shift quality.

We claim:

1. A pressure control valve for selectively applying hydraulic line pressure to a friction element in an automatic transmission, comprising:

a valve body;

a valve spool arranged in the valve body for linear movement, said valve spool having a hydraulic reducing pressure applied adjacent one end for exerting a force on the valve spool in a first direction, said hydraulic reducing pressure being less than the hydraulic line pressure, and a duty control pressure applied adjacent an opposing end for exerting a force on the valve spool in a second direction opposite the first direction, said duty control pressure being selectable between a first hydraulic pressure and a second hydraulic pressure, said first and second hydraulic pressure being less than the hydraulic reducing pressure, and said first hydraulic pressure being less than said second hydraulic pressure;

a plug positioned at said opposing end of the valve spool, said duty control pressure exerting a force on the plug in the first direction; and a feedback line for feeding the hydraulic line pressure back to the plug when the hydraulic line pressure is applied to the friction element, said hydraulic line pressure exerting a force on the plug in the second direction.

2. The pressure control valve according to claim 1 wherein the valve spool includes a first land with a first pressure acting area on which the hydraulic reducing pressure acts in the second direction, a second land which has a second pressure acting area on which the hydraulic reducing pressure acts in the first direction, said second pressure acting area being larger than the first pressure acting area, a third land on which the duty control pressure acts, and an elastic member acting on the plug which biases the valve spool in the first direction.

3. The pressure control valve according to claim 1 wherein the valve body includes a first port in which the hydraulic line pressure flows, a second port for feeding the hydraulic line pressure to the friction element, a third port in which the hydraulic reducing pressure flows, a fourth port for receiving the duty control pressure, a fifth port for receiving the hydraulic line pressure from the feedback line, and a sleeve which forms the fifth port and includes the plug therein.

4. The pressure control valve according to claim 1 wherein the feedback line includes a damper, having at least one orifice, to stabilize the hydraulic line pressure fed back to the valve body.

5. The pressure control valve according to claim 1 further comprising a second pressure control valve for selectively controlling the duty control pressure between the first and second hydraulic pressure.

6. The pressure control valve according to claim 5 wherein the second pressure control valve comprises a solenoid.

* * * * *